May 3, 1938.  W. RÜSCH  2,116,083

RUBBER TUBE FOR MEDICAL USE

Filed June 14, 1935  2 Sheets-Sheet 2

Inventor
Willy Rüsch
by
Atty.

Patented May 3, 1938

2,116,083

UNITED STATES PATENT OFFICE 2,116,083

RUBBER TUBE FOR MEDICAL USE

Willy Rüsch, Rommelshausen, near Stuttgart, Germany

Application June 14, 1935, Serial No. 26,660
In Germany May 11, 1935

4 Claims. (Cl. 164—125)

My invention relates to rubber tubes for medical use such as intestinal tubes, catheters or the like and to a process of making same in a simpler and more perfect manner than was hitherto possible.

In rubber tubes for medical use which are closed at one end and formed with one or a plurality of apertures, these latter apertures are produced as a rule with the aid of boring or stamping tools. The apertures produced in this manner in the tube wall are formed with comparatively sharp edges, which are polished as a rule with the aid of pumice stone and petrol or the like, but nevertheless mostly present a more or less sharp edge which, when the tube is introduced into a sensitive intestine or the like, can be the cause of injuries and may cause pains. Similar ridges are formed, if a shaping piece is forced into the raw tube to form an aperture and is withdrawn after vulcanization.

It has also been tried to form the apertures by inserting the rubber tube in a glass tube formed with a depression at the point where an aperture shall be formed in the rubber tube. In this glass tube the rubber tube is now vulcanized with steam and the depressed portion formed in the rubber tube then serves for the formation of the aperture. However, the forcing of the solid end of the rubber tube into the glass tube past the depressed portion is connected with difficulties. Moreover many glass tubes are destroyed at this point during vulcanization, since stresses are set up in the glass, which cannot be got rid of altogether on cooling.

According to the present invention the apertures are formed in such tubes in a manner, in which these drawbacks are avoided and a tube is produced, which involves a number of important advantages as compared with tubes produced according to processes as hitherto used.

I form the apertures in the tube by first forming a flat depression in the parts of the tube, where an aperture shall be formed, by removing the tube material by grinding, the depression thus formed extending in a flat curve, and I then form the apertures in this depressed portion of the tube by boring or stamping in such manner that the aperture is surrounded by a flat edge.

I prefer producing the flat depression by means of a cylindrical grinding disk, the axis of rotation of which is mounted at right angles to the tube axis. By grinding the tube wall by means of such disk and by thereafter forming the holes or apertures by boring or stamping an edge is formed round these apertures, which is slightly inclined inwardly from the outer circumferential surface of the tube wall, so that the aperture proper is somewhat recessed relative to the outer wall of the tube. I am thus enabled to produce apertures lacking the sharp edge mentioned above.

This mode of producing the apertures is also connected with considerable less costs than by the method hitherto followed, since the grinding away of part of the tube wall by means of a grinding disk is a far simpler matter than the subsequent polishing of the edges. I am moreover enabled to produce the apertures in the wall of the hollow tube as well as in the solid end of the tube only after vulcanization.

I will now describe my invention and the manner in which it is performed, having reference to the drawings affixed to this specification and forming part thereof, in which a tube according to this invention and the means for producing same are illustrated diagrammatically by way of example. In the drawings Fig. 1 is a plan view of a tube formed with two apertures, one in the solid closed end and one in the side wall of the tubular part of the tube.

Figure 1:
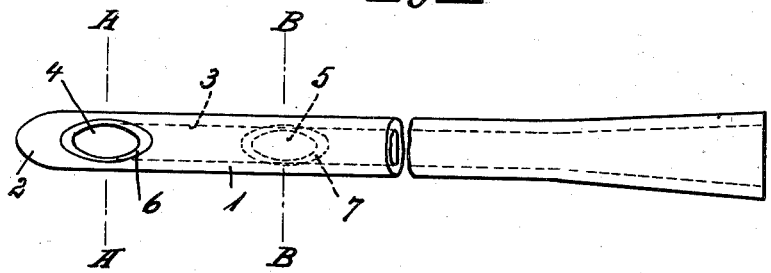
Figure 2:
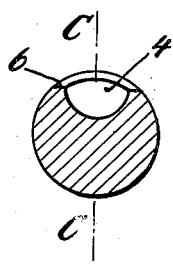
Fig. 2 is a cross section drawn to a larger scale on the line A—A in Fig. 1.
Figure 3:
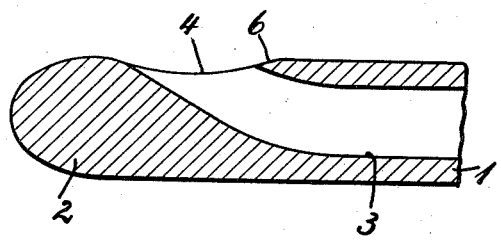
Fig. 3 is a longitudinal section on the line C—C in Fig. 2.
Figure 4:
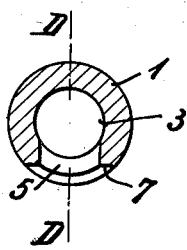
Fig. 4 is another cross section on the line B—B in Fig. 1.
Figure 5:
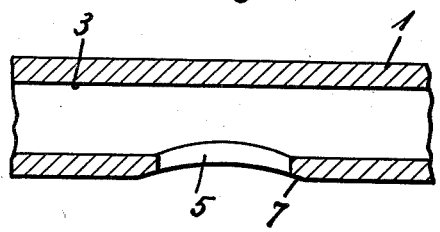
Fig. 5 is a longitudinal section on the line D—D in Fig. 4.

Referring to the drawings, 1 is the rubber tube and 2 is its closed solid end, 3 being the tube wall proper. The marginal portions (edges) 6 and 7 of the two apertures 4 and 5 are ground according to a cylindrical surface and therefore extend inwardly with their narrow ends 10 sloping towards the middle portion 11.

Figure 6:
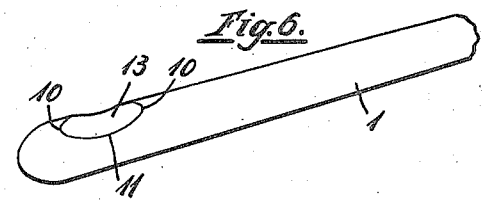
Fig. 6 is a perspective view of the solid end of the tube with a depression formed therein by grinding.
Figure 7:
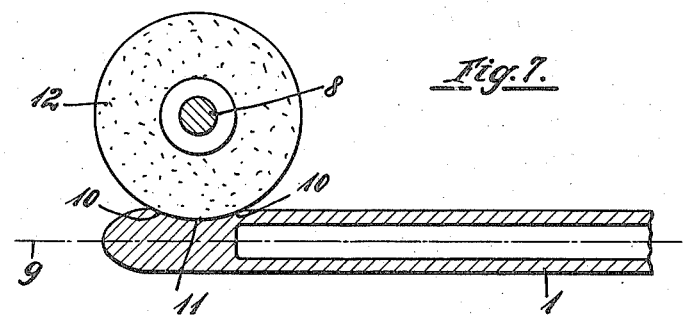
Fig. 7 is a longitudinal section of the tube showing the way in which the depression is formed in the solid end of the tube by means of a grinding disk.
Figure 8:
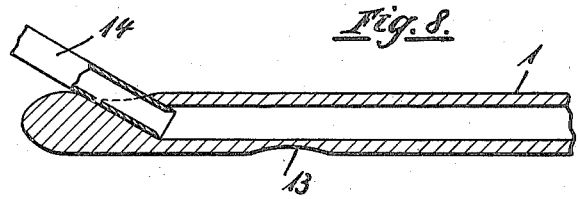
Fig. 8 is a longitudinal section of the tube showing the way in which the aperture is formed in the depressed portion of the solid end of the tube and Fig. 9 is another axial section illustrating the stamping out of the aperture in the tubular part of the tube.
Figure 9:
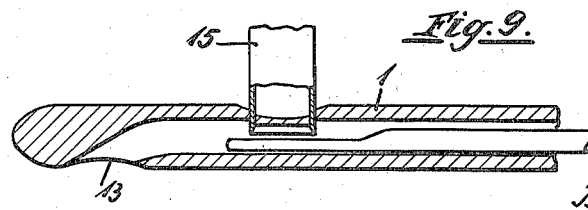

Before forming the apertures a flat curved depression 13 (Fig. 6) is formed in the outer wall of the tube by means of the grinding disk 12, the shaft 8 of which extends at right angles to the tube axis 9. On the depression 13 having been formed in the solid portion of the tube as shown in Fig. 7, a tubular cutter 14 is forced into the tube in oblique direction, as illustrated in Fig. 8, whereby a channel is formed which extends from the depression 13 to and merges into the tubular bore of the tube. Similar depressions are formed by grinding in the wall of the tubular portion (Fig. 8), which are then cut through with a tubular stamp 15 of oval cross section (Fig. 9).

Various changes may be made in the details disclosed in the foregoing specification without departing from the invention or sacrificing the advantages thereof.

I claim:—

1. The method of producing a rubber tube for medical use having an aperture formed in the wall which comprises forming in the tube wall by grinding a depression formed in accordance with part of a cylindrical surface and thereafter piercing the middle part of said depressed portion.

2. The method of producing a rubber tube for medical use having an aperture formed in the wall which comprises acting on the tube wall with a cylindrical grinding tool, the axis of which extends substantially at right angles to the tube axis, and thereafter cutting out the middle portion of the depressed part, thus formed, of the tube wall.

3. The method of producing a rubber tube for medical use having an aperture formed in the wall which comprises forming a depression in the solid end of the tube blank by grinding away part of the tube material with a cylindrical grinding tool, the axis of which extends substantially at right angles to the tube axis, and cutting out the middle portion of the depressed part thus formed of the tube wall with a tubular cutter extending at a pointed angle to the tube axis.

4. The method of producing a rubber tube for medical use having an aperture formed in the wall which comprises forming a depression in the wall of the hollow part of the tube by grinding away part of the material of the wall with a cylindrical grinding tool, the axis of which extends substantially at right angles to the tube axis, and cutting out the middle portion of the depressed part of the tube wall by means of a hollow cutter of oval cross section.

WILLY RÜSCH.